United States Patent Office 3,699,023
Patented Oct. 17, 1972

3,699,023
METHOD FOR MAKING HIGH TEMPERATURE INSULATING COMPOSITIONS AND SAID COMPOSITIONS
George A. Kuhar, Greensburg, Ohio, assignor to The Goodyear Tire & Rubber Company, Akron, Ohio
No Drawing. Continuation of application Ser. No. 340,796, Jan. 28, 1964. This application May 14, 1968, Ser. No. 729,129
Int. Cl. C08d 1/00; C08f 1/00
U.S. Cl. 204—159.19
6 Claims

ABSTRACT OF THE DISCLOSURE

A method for preparing a high temperature insulator comprising the steps of preparing a reaction mixture of a polyester polyol, an organo-peroxide, an organic polyisocyanate and a filler having a resistance to burning; and setting and curing the reaction mixture at a temperature no greater than about 250° F. for about 10 to 20 hours followed by subjecting the cured reaction mixture to a treatment of at least 300° F. for at least 10 hours or an ionizing radiation treatment of about 5 to about 30 megarads.

---

This application is a continuation of application Ser. No. 340,796, filed Jan. 28, 1964, and now abandoned.

This invention relates to a process for making polyurethane insulating compositions and to said compositions per se. More particularly, this invention relates to polyurethane reaction mixtures which are fluid or flowable under slight pressure and which may be cast and cured and then subjected to a post cure treatment to yield a solid insulating composition having improved burn resistance and insulating properties.

In recent years a demand has arisen for insulating compositions of an elastomeric nature which are capable of resisting temperatures in the range of 5000° F. and higher for short periods of time for the purposes disclosed in Canadian Pat. 664,884 and application Ser. No. 66,931 filed Nov. 3, 1960, now abandoned, for high temperature polyester urethane insulating composition.

An object of this invention is to provide a method of improving the thermal insulating and burn resistance of polyurethane composition.

The objects of this invention can be accomplished by (1) Forming a polyurethane composition comprising a relatively burn resistant or insulating filler or a refractory filler and the reaction product of a polyester polyol and an organic polyisocyanate;

(2) Curing said composition with a peroxide at a temperature less than about 250° F. for a period of time up to about 10 to 30 hours, and (3) Subjecting the cured composition to a radiant energy treatment of the type hereinafter described, usually sufficient to give at least about 5% improvement in burn rate as measured in the arc image furnace.

It has been found that by subjecting a cured polyurethane composition containing a refractive filler to a post cure treatment of at least about 10 hours at a temperature in excess of 300° F. the post cured composition has improved insulating properties in addition to greater resistance to burn. Alternately the post cure treatment may be effected by subjecting the cured polyurethane composition to an ionization radiation sufficient to give a dosage of at least about 5 megarads. Usually for economic reasons the ionizing radiation treatment will not exceed about 30 megarads.

The term "ionizing radiation" denotes radiation which has at least sufficient energy to produce ions or break chemical bonds, and includes radiation both in the form sometimes regarded as particle radiation, such as electrons and protons, and in the form sometimes regarded as ionizing electro-magnetic radiation, as for example, x-rays and gamma rays. Although both types of radiation usually produce somewhat similar effects, the utility of each varies depending on the physical characteristics of the article to be irradiated and other factors.

The unit of radiation refered to as the "rad" represents that amount of radiation which will impart 100 ergs per gram of material and is related to other radiation units such as the "rep" by well known conversion factors. For convenience, radiation dosages are expressed in terms of millions of "rads" or "megarads".

The polyester polyols useful in this invention normally have an acid number less than 5 and preferably less than 2 to 3 with hydroxyl numbers of about 30 to 120. The molecular weight of the polyesters useful in this invention may vary from about 750 to 6000 with the preferred range being about 1000 to 3500.

Since the saturated polyester polyols yield polyurethane compositions with the relatively burn resistant or insulating fillers which melt in the oxyacetylene flame, the unsaturated polyesters are preferred. For example, our observations indicate that where the polyester polyol contains insufficient unsaturation to be readily peroxide cured at temperatures less than about 275–290° F. and preferably about 90 to 150° F., these polyester polyols also yield polyurethane compositions with said fillers which melt in the oxyacetylene flame, or the peroxide cured composition is porous. Our experience further indicates that the polyester polyol should have at least one double bond for each 3000 units of molecular weight. Better results are obtained though when the polyester polyol contains at least one double bond for each 2000 units of molecular weight with the best results being obtained at about one double bond for each 750 to 1500 units of molecular weight.

The unsaturation of the polyester can be either linear or pendant. This unsaturation in the polyester can come from either one of the reactants, i.e. the glycol and the dicarboxylic acid or the anhydrides of said acid. By the term "linear unsaturation" is meant the unsaturation occurs in the polymer in the main carbon to carbon chain forming the polymer backbone. By the term "pendant unsaturation" is meant non-linear unsaturation, i.e. the unsaturation occurs as an ethylenic double bond in a branch chain such as an allyl or vinyl radical depending from the main chain or polyester backbone.

Representative examples of those dicarboxylic acids and anhydrides which introduce linear unsaturation into the polyester are: maleic; fumaric; citraconic; itaconic; muconic; dimethyl maleic; ethyl maleic; glutaconic; crocetin; pentadecene - 1,15-dicarboxylic acid; cis-4-tetrahydrophthalic; and Diel-Alder reaction products of alpha-beta unsaturated compounds, such as butadiene, isoprene, anthracene and abietic acid with the unsaturated dicarboxylic acids or anhydrides such as maleic acid and related unsaturated dicarboxylic acids.

Representative examples of those acids and anhydrides which introduce pendent unsaturation are dodecenyl succinic anhydride or acid and heptenyl maleic anhydride or acid.

Representative examples of the unsaturated glycols are vinyl glycol; 4,5-dihydroxoctadiene-2,6; divinyl glycol; dipropenyl glycol; butene-2-diol-1,4; glyceryl allyl ether; propenyl glycol; (diethanol) allyl amine; (dipropanol) allyl amine; (dibutanol) allyl amine and (dipentanol) allyl amine.

As is well known, polyesters can be produced by the esterification reaction which comprises condensing at least one glycol with at least one dicarboxylic acid or anhydride.

The resulting polyester will be unsaturated if either the glycol or dicarboxylic acid or anhydride contain unsaturation. It also should be appreciated that unsaturated polyesters can be produced by adding about 5 to 20 mol percent or higher of an unsaturated glycol, dicarboxylic acid or anhydride to an esterification mixture which contains a saturated glycol and a saturated dicarboxylic acid or anhydride. This procedure produces polyesters containing varying amounts of unsaturation. The amount of unsaturation depends primarily upon the amount of unsaturated reactant present in the esterification mixture. Thus, it is possible to produce polyesters having a high degree of unsaturation as well as one having a low degree of unsaturation, about one double bond for each 3000 or 4000 units of molecular weight.

Representative examples of saturated glycols suitable for this purpose are ethylene glycol, propylene glycol, tetramethylene glycol, pentamethylene glycol, hexamethylene glycol, decamethylene glycol, xylene glycol, and mixtures thereof.

Representative saturated dicarboxylic acids or anhydrides are succinic, adipic, pimelic, suberic, azelaic and sebacic, phthalic, terephthalic, and isophthalic.

It is not absolutely essential that an unsaturated glycol or dicarboxylic acid be used to introduce unsaturation in the polyester. For example, it is well known that pendent unsaturation may be introduced into the polyester by the use of an epoxy unsaturated monomer as one of the reactants. For example, allyl glycidyl ether may be used to react with an alkylene oxide, such as ethylene oxide or propylene oxide to produce unsaturated glycols which may be used to form the polyester. Also, these epoxy unsaturated monomers may be used in the esterification reaction to produce polyesters having pendent ethylenic unsaturation. Representative examples of these useful epoxy unsaturated monomers are allyl glycidyl ether, vinyl glycidyl ether, epoxy butadiene, epoxy isoprene and epoxy octylene.

Any organic polyisocyanate can be used to form the reaction mixture with the polyester. Examples of suitable diisocyanates for use in the preparation of the diisocyanate modified polyester are hexamethylene diisocyanate;
2-nitrodiphenylene-4,4'-diisocyanate;
diphenylmethane-4,4'-diisocyanate;
2-nitro-diphenylmethane-4,4'-diisocyanate;
naphthalene-1,4-diisocyanate;
naphthalene-1,5-diisocyanate;
naphthylene-2,7-diisocyanate;
fluorene-2,7-diisocyanate;
chrysene-2,8-diisocyanate;
1-chlorophenylene-2,4-diisocyanate;
tolylene-2,4-diisocyanate;
tolylene-2,6-diisocyanate; dicyclohexylmethane-4,4'-diisocyanate;
diparaxylyl methane-4,4'-diisocyanate diphenylene-4,4'-diisocyanate;
4,4'-cyclohexylphenyl diisocyanate and
3,3'-dimethyl-4,4'-diphenylene diisocyanate.

In general the organic polyisocyanate molar ratio to polyester is about .9 to 1.1 and some higher as these have been found to be the practical ranges for preparing elastomeric polyurethanes. The preferred range of organic polyisocyanate to polyester is about 1.03 to about 1.08. As indicated above, higher molar ratios may be used but in general these higher ratios will tend to increase the degree of crosslinking and reduce the elastic properties of the resulting rubber.

The organic peroxides useful in this invention are those capable of curing unsaturated polyesters in the presence of fillers. Representative examples of these organic proxides are ditertiarybutyl peroxide; ditertiary amyl peroxide; 2,2-di(tertiarybutylperoxy) butane; di(alpha, alpha-dimethylbenzyl) peroxide (also known as dicumene or dicumyl peroxide); di(alpha, alpha-dimethyl-p-chlorobenzyl) peroxide; di(alpha, alpha-dimethyl-2,4-dichlorobenzyl) peroxide; tertiarybutyl-1-methylcyclohexyl peroxide; 2,5-ditertiary butyl peroxide-2,5-dimethyl hexane; and peroxides formed by the oxidation of terpene hydrocarbons such as turpentine, alpha-pinene, paramethane and pinane. Of these peroxides the class of ditertiary peroxides are preferred with dicumyl peroxide and 2,4-ditertiary butyl-2,5-dimethyl hexane being representative and preferred members of this class.

The relatively burn resistant and/or insulating fillers useful in this invention can be divided into the groups of the insulating and burn resistant fillers, and the auxiliary burning resistant agents. These fillers should be finely divided in order to be readily mixed with the polyester or other ingredients. The insulating and burn resistant fillers belong to the class of non-metallic fillers known as the silicate minerals. Linus Pauling at pages 523–528 of his book, "General Chemistry" 1948 edition, published by W. H. Freeman and Company, discusses the chemistry of the silicate minerals and divides them into three classes, the framework minerals, the layer structure minerals and the fibrous minerals. Although any of the fillers from the silicate minerals may be used, it was observed that the ablation of the char was more pronounced with the fillers from the framework and layer structure type silicate minerals. Therefore, due to the pronounced ablation characteristic of these particular classes of silicates, the burn time of some of these are not too good, especially where the point of impingement of the oxyacetylene flame on the insulation composition is subjected to the abrading action of a metal rod. In addition to this, some of these minerals contain appreciable amounts of hydrated water which is undesirable where the minerals are to be subjected to high temperature. Consequently, the preferred burn resistant and insulating fillers belong to the fibrous minerals such as diopside, spodumene, Wollastonite, anthophylite and the asbestos minerals such as tremolite and chrysotile.

It should be further appreciated that the preferred insulating fillers useful in this invention are further characterized by the property of yielding a fluid mixture with the ethylene glycol polyester of adipic and maleic acids when at least 5 to 10 parts of filler is added at about 75° F. for each 100 parts of the polyester of about 2000 molecular weight. In fact, this test can be used to characterize those fillers useful for preparing the liquid or fluid reaction mixtures. In general, the amount of filler used will be limited to less than those proportions that yield solid mixtures with 100 parts of the mixed polyester of ethylene adipate-maleate, but this should not be taken to indicate a solid reaction mixture may not be useful provided the handling of such a mixture can be achieved and also it should be realized that these solid reaction mixtures cannot be used for making castings but must be extruded or milled.

The auxiliary burn resistant agents are carbon black, graphite, antimony oxide, chlorowax, and the highly chlorinated hydrocarbons. These burn resistant agents appear to promote char formation and to affect the nature of the char. Furthermore, the char appears to shield the virgin polyurethane from the full effect of the flame.

Compositions of this invention having dimensions 4" x 4" x ½" require more than one minute to burn through when subjected to an acetylene torch at the point where the temperature is at least about 5000° F. During this burning test the insulating block first chars. This char should be relatively resistant to separation or ablation from the uncharred insulating material. For example, the blocks of this invention when subjected to an oxyacetylene torch can be scratched with a suitable rod at the point of impingement of the oxyacetylene flame on the block and yet it will take more than one minute for the oxyacetylene torch to burn through this block.

More specifically, the castable insulating composition of this invention may be formed by adding from about 1 to 50 parts of a fibrous mineral to an unsaturated polyester polyol having at least two hydroxyls and at least one double bond per 3000 units of molecular weight or per molecule of unsaturated polyester. This mixture of unsaturated polyester and fibrous mineral, while at about 100 to 200° F. is subjected to a vacuum for sufficient time to remove any moisture present therein, namely, the so-called degassing step; then a peroxide curing agent may be added or it may have been added previously.

Normally about 0.25 to about 5 or more parts of peroxide curing agent per 100 parts of polyester is required with the preferred range being 0.5 to 3 parts depending on the nature and the amount of fillers used and the degree of unsaturation in the polyester. After the fibrous mineral, unsaturated polyester, and peroxide curing agents have been degassed to remove any moisture present, an organic polyisocyanate is added to the mixture and stirred to form a uniform mixture. This mixture will be fluid if the amount of fibrous mineral added does not exceed certain critical limits which depends primarily on the specific nature of the fibrous mineral to be used. For example, where the fibrous mineral is flocked asbestos, then about 10 to 15 parts per 100 parts of unsaturated polyester will yield a reaction mixture which is no longer liquid but which is still fluid enough to be injected under slight pressure, less than about 50 pounds per square inch, into molds or other suitable shaping means. On the other hand, if the silicate mineral is mica, as much as 50 parts may be used and the reaction mixture will be very fluid. Similarly, Wollastonite will form a very fluid reaction mixture when used in proportions as high as 50 parts per 100 parts of polyester. Therefore, the amount of silicate mineral used in the castable compositions is determined primarily by the flow characteristics of the resulting reaction mixture.

In order to permit a satisfactory burning resistance to be obtained and still obtain a relatively fluid reaction mixture, it is desirable and preferred that an auxiliary burning resistant agent be used along with the silicate mineral. For example, it is desirable to use a material like graphite, chlorowax, antimony oxide and related materials which resist burning and also enhance the rate of char formation. It has been observed during tests that the materials which had the greatest resistance to burning were those which most readily formed a char that was of a continuous nature, resistant to cracking and also exhibited considerable adhesion for the virgin insulating material not yet charred by the heat of the flame.

In this regard it is desirable that the fillers have a melting point in excess of about 2000° F. and preferably as high as 3000° F. or higher. For example, it is noted that silica does not promote good adhesion of the charred to the uncharred material as it is not fibrous in nature and it also tends to melt and flow at temperatures obtained with the oxyacetylene flame more readily than a fibrous material such as asbestos. Therefore, the fibrous mineral materials useful in this invention are further characterized by the properties of having one dimension substantially greater than the other two dimensions, i.e. they are essentially acicular in nature, and have melting points of at least 2000° F. and preferably of at least 3000° F. These materials are normally formed by the reaction or characterized as the product of at least an alkali or alkaline earth metal with a silicate. Representative examples of preferred silicate minerals are lithium aluminum silicate (spodumene), potassium aluminum silicate (mica) and calcium silicate (Wollastonite F-1), and asbestos.

The auxiliary burn resistant agents are particularly characterized by the feature of enhancing the rate of char formation and the nature of the char formed, i.e. the char formed offers considerable resistance to abrasion when abraded with a metal rod during and at the point of impingement of the oxyacetylene flame on the insulation composition. One of the beneficial effects obtained by using auxiliary agents is that they permit lower amounts of the silicate minerals to be used in order to obtain fluidizable reaction mixtures and yet still obtain the desired reduction in burn rate.

The practice of this invention is further illustrated with respect to the following examples which are representative rather than restrictive of the scope of this invention. Parts and percentages are shown by weight unless otherwise specified.

EXAMPLE I

An unsaturated polyester was formed by the condensation of adipic acid with a mixture consisting of 85 mol percent of propylene glycol and 15 mol percent of glycerol allyl ether. This polyester had a molecular weight of about 2000, a reactive number of 60 and an acid number of less than 5. This unsaturated polyester (600 parts) was mixed with Spodumene (180 parts), sodium borate (180 parts) and 6 parts dicumyl peroxide. This mixture was mixed at 90° C. with 0.5 part of phenyl-beta naphthylamine and a vacuum was maintained upon the system during the mixing for 15 minutes thereafter. This treatment removed any occluded free moisture present in these reactants to give substantially an anhydrous mixture. Then 102 parts of tolidine diisocyanate was added and stirred into the above degassed ingredients at 90 to 102° C. The stirring was continued for ten minutes before the fluid mixture was poured into molds 4" x 4" x ½" and held at 212° F. for 19 hours to set and cure the fluid mixture. The cured material was removed from the mold, and had a good structure free of pores, a Shore A hardness of 70 and good flexibility. When this cast block was subjected to 5000 ° F. oxyacetylene torch burn test the burn rate was 4.0 mils per second. A duplicate casting 4" x 4" x ½" was given a post cure for 96 hours at 325° F. under a nitrogen atmosphere and then was subjected to the 5000° F. oxyacetylene torch test. The post cured sample had a burn rate of 2.6 mils per second.

EXAMPLE II

The recipes set forth in Table 1 were used to make cast insulating compositions. These cast insulating compositions were formed in blocks ⅜" thick, then part of the blocks were subjected to the post cure treatment in Table 1 before being subjected to the oxyacetylene burning tests. The results of this test are shown in Table 1.

TABLE 1

| R108X | 366 | 367 | 368 | 369 |
|---|---|---|---|---|
| Polyester [1] | 600 | 600 | 600 | 600 |
| Phenyl-beta naphthylamine | 0.5 | 0.5 | 0.5 | 0.5 |
| Spodumene | 180 | 180 | 180 | 180 |
| Sodium borate | 180 | 180 | 180 | 180 |
| Tolidine diisocyanate | 78 | 90 | 102 | 90 |
| Peroxide 10 [2] | 6 | 6 | 6 | 3 |
| Burn rate in mils/second | | | | |
| Original cure | 4.0 | 3.6 | 3.6 | 6.3 |
| Post cured with 10 MR | 3.1 | 3.2 | 3.5 | 4.0 |
| Post cured 96 hrs. at 325 under N₂ | 2.6 | 2.8 | 1.8 | 3.2 |

[1] The same polyester as that used in Example I.
[2] A material reported to contain in excess of 95% dicumyl peroxide with the rest being inerts.

Similar results may be obtained by substituting other unsaturated polyesters, such as propylene adipate fumarate for the one of this example.

EXAMPLE III

A polyurethane reaction mixture was made using the recipes indicated in Table 2 and then the resulting liquid reaction mixture was allowed to react and then was cured by subjecting the reaction mixture which contained the peroxide 10 therein to a cure treatment which consisted of letting the reaction mixture stand at room temperature overnight and then heating at 212° F. for 16 hours. Then part of the cured samples were subjected to ionizing radiation in a Cobalt 60 radiation cell for sufficient time to give a radiation dosage of the indicated Megarads. These samples were subjected to burn rate determination in an arc image furnace at about 5000° F. The burn rate on the original cured sample and on the samples which received the post cure treatment are listed in Table 2 along with the Shore A hardness of these samples.

The cured samples which were 4 x 4 x ½ inch on the side had a thermocouple placed ¼ inch from the top of the sample and a thermocouple placed in the hole

TABLE 2

| R108X | 520 | 522 | 524 | 520 | 522 | 524 |
|---|---|---|---|---|---|---|
| Polyester [1] | 600 | 600 | 300 | | | |
| Mica, 160 mesh | 90 | | 45 | | | |
| Mica, 325 mesh | 90 | 90 | 45 | | | |
| Phenyl beta naphthylamine | 1.0 | 0.5 | 0.5 | | | |
| Tolidine diisocyanate | 144.6 | 74.4 | 37.2 | | | |
| Peroxide 10 | 6 | 6 | 3 | | | |
| Asbestos | 12 | | | | | |
| Glycerol allyl ether | 35.5 | | | | | |
| Cork | | 50 | | | | |
| Calcium metaborate | | | 45 | | | |
| | Burn rate | | | Shore A hardness | | |
| Cured sample | 3.3 | 3.9 | 4.3 | 79 | 83 | 52 |
| Post cure: [2] | | | | | | |
| 5.3 | 2.4 | 3.3 | 3.8 | 89 | 91 | 82 |
| 10 | 2.7 | 3.4 | 3.5 | 89 | 94 | 84 |
| 30 | 2.5 | 3.5 | 2.9 | 94 | 97 | 91 |
| 110 | 2.4 | 3.3 | 2.7 | 93 | 96 | 91 |
| 150 | 2.5 | 3.7 | 2.7 | 92 | 96 | 91 |
| 205 | 2.4 | 3.8 | 2.6 | 90 | 96 | 91 |

[1] The same polyester as that used in Example I.
[2] The post cure treatment is expressed as megarads.

EXAMPLE IV

An unsaturated polyester was prepared by the condensation of adipic acid with a mixture consisting essentially of 85 parts of propylene glycol and 15 parts of glycerol allyl ether to obtain an unsaturated ester having an acid number of less than 2 and a total reactive number of about 40 to 60. This polyester contained one double bond for about every 1500 units of molecular weight.

This polyester (600 parts) containing 1.0 part of phenyl beta naphthylamine was mixed with mica (90 parts 160 mesh and 90 parts 325 mesh), and 180 parts of sodium borate and heated with stirring at 90–109° C. under a vacuum for 30 minutes to degas the mixture. Six parts of a commercial dicumyl peroxide was added and stirred into the mixture. This addition was followed by the addition of 102 parts of orthotolidine diisocyanate. After stirring for nine minutes, the pasty mixture was poured into aluminum molds ⅜" on a side and covered with an aluminum lid. These molds were held at 100° C. for 20 hours to set and cure the polyurethane. Part of the coatings were cured by treatment with 10 megarads of gamma radiation, others were cured by heating at 325° F. in a nitrogen atmosphere for 120 hours and 576 hours. The 10 megarads sample had an oxyacetylene torch (5000° F.) burn rate of 3.1 mils per second and formed a tough char. While the burn rate for samples cured in a nitrogen atmosphere at 325° F. for 120 hours and 576 hours were 2.0 and 2.6 respectively.

drilled in the sample in alignment with the focal point of the arc image. The burn rate was run and the results are reported in Table 3 as the time required for the thermocouple to reach the temperature indicated. These results for the original cured sample are reported in the column headed "Original Cure" and the results for the samples which had received the post cure treatment for 48 hours at 325° F. are reported in the column headed "Post Cure."

TABLE 3.—THERMOCOUPLE HEAT TRANSFER TEST

| Thermocouple temperature, °F. | Original cure, minutes | Post cure, minutes |
|---|---|---|
| 200 | 1.13 | 1.49 |
| 250 | 1.39 | 1.89 |
| 300 | 1.74 | 2.27 |

EXAMPLE V

A polyurethane reaction mixture was made by compounding the polyurethane ingredients according to the recipe indicated in Table 4 and then they were cured by allowing the mixture to stand overnight and then heating for 16 hours at about 212° F. The burn rate on the samples cured in this manner are reported in Tables 4 and 5 under normal cure burn rate. Other samples were given a post cure treatment and the post cure treatment which gives the best burn rate is reported as best cure hours at 325° F.

TABLE 4

| R108 | x366 | x368 | x379 | x384 | x415 | x443 | x445 | x446 |
|---|---|---|---|---|---|---|---|---|
| Polyester [1] | 600 | 600 | 600 | 600 | 300 | 600 | 600 | 600 |
| Phenyl beta naphthylamine | 0.5 | 0.5 | 0.5 | 0.5 | | 0.5 | 0.5 | 1.0 |
| Spodumene | 180 | 180 | | | | | | |
| Sodium borate | 180 | 180 | | 60 | | 180 | 180 | 180 |
| Tolidine diisocyanate | 78 | 102 | 76.4 | 76.4 | | 102 | 102 | 114 |
| Peroxide 10 | 6 | 6 | 6 | 6 | | 6 | 12 | 12 |
| Mica, 160 mesh | | | | | | 90 | 90 | 90 |
| Mica, 325 mesh | | | 120 | 120 | 90 | 90 | 90 | 90 |
| Graphite | | | 60 | 60 | | | | |
| Acrylonitrile | | | | | 30 | | | |
| Specific gravity | 1.47 | 1.46 | 1.35 | 1.392 | | 1.468 | 1.468 | 1.461 |
| Burn rate [2] | 4.0 | 3.6 | 3.8 | 3.0 | | | | |
| Burn rate [3] | 24 | 96 | 96 | 96 | | 120 | 120 | 120 |
| Best burn rate | 2.6 | 1.8 | 2.7 | 2.4 | | 2.0 | 2.2 | 2.0 |

[1] Same as polyester used in Example I.
[2] Burn rate run on samples cured overnight at room temperature and 16 hours at 212° F.
[3] Burn rate run on best cure which is expressed as hours at 325° F.

TABLE 5

|  | 450 | 476 | 481 | 487 | 495 | 496 | 497 | 499 |
|---|---|---|---|---|---|---|---|---|
| Polyester [1] | 600 | 600 | 600 | 600 | 300 | 300 | 300 | 600 |
| Phenyl beta-naphthylamine | 0.5 | 0.5 | 0.5 | 1.0 | 0.5 | 0.5 | 0.5 | 1.0 |
| Peroxide 10 | 6 | 6 | 6 | 6 | 3 | 3 | 3 | 6 |
| TODI | 102 |  | 76.4 | 102 | 51 | 51 | 51 | 74.4 |
| Spodumene | 180 |  |  |  |  |  |  |  |
| Sodium borate | 180 |  | 90 | 180 |  |  |  |  |
| Mica, 160 mesh |  | 90 | 45 | 180 |  |  |  | 180 |
| Mica, 325 mesh |  | 90 | 45 | 180 | 90 |  |  | 180 |
| TDI |  | 50.4 |  |  |  |  |  |  |
| Pulvazone (325 mesh vermiculite) |  |  |  |  | 45 | 45 | 45 |  |
| Wollastonite |  |  |  |  | 45 | 45 | 45 |  |
| Best cure [2] | 240 | 48 | 24 | 24 | 48 | 24 | 48 |  |
| Burn rate | 2.9 | 2.7 | 2.6 | 2.9 | 2.7 | 2.9 | 2.7 |  |

[1] The same polyester used in Example I.
[2] Best cure represents hours at 325° F. in addition to 16 hours at 212° F. used in normal cure.

EXAMPLE VI

In this example the polyurethane reaction mixture was prepared and cured by letting the reaction mixture stand overnight at room temperature and then heating at 212° F. for 16 hours. Then the samples were given a post cure treatment by subjecting them to sufficient ionizing radiation to give the dosage indicated in Table 6. These samples were burned in an arc image furnace and the resulting burn rate is reported in Table 6.

TABLE 6

| R108X | 508 | 509 |
|---|---|---|
| Polyester [1] | 600 | 600 |
| Mica, 325 mesh | 105 | 105 |
| Mica, 160 mesh | 105 | 105 |
| Peroxide 10 | 6 | 6 |
| Phenyl beta naphthylamine | 0.5 | 0.5 |
| Tolidine diisocyanate | 144.6 | 184.2 |
| Glycerol allyl ether | 35.5 | 35.5 |
| Burn rate | | |
| Normal cure [2] | 3.2 | 2.3 |
| Post cured at megarads: | | |
| 23 | 2.7 | 2.7 |
| 41 | 2.5 | 2.6 |
| 61 | 2.8 | 2.5 |
| 120 | 2.9 | 2.5 |

[1] The same polyester as that of Example I.
[2] Normal cure is overnight at room temperature and 16 hours at 212° F.

The abbreviation "TDI" stands for toluene diisocyanate and "TODI" stands for tolidine diisocyanate.

While certain representative embodiments and details have been shown for the purpose of illustrating the invention, it will be apparent to those skilled in this art that various changes and modifications may be made therein without departing from the spirit or scope of the invention.

What is claimed is:

1. In a method for preparing a high temperature insulator comprising the steps of:
   (1) preparing a reaction mixture consisting essentially of a polyester polyol, an organo-peroxide, an organic polyisocyanate and a filler having resistance to burning,
   (2) setting and curing the reaction mixture at a temperature no greater than about 250° F. for about 10 to 20 hours, the improvement comprising subjecting the cured reaction mixture to a treatment sufficient to increase its burn resistance in an arc image furnace by at least 5 percent, said treatment comprising subjecting the cured reaction mixture to a treatment of at least 300° F. for at least 10 hours or an ionizing radiation treatment of about 5 to about 30 megarads.

2. The improvement of claim 1 wherein the post treatment is at least about 10 hours.

3. The improvement of claim 1 wherein the mixture contains at least about 0.25 to about 3 parts of organic peroxide for each 100 parts of polyester polyol and the molar ratio of polyester polyol to organic polyisocynate is about 0.90 to about 1.1.

4. The improvement of claim 1 wherein the filler is fibrous.

5. The improvement of claim 1 wherein the reaction mixture contains at least one part of filler per 100 parts of polyester polyol and less than that amount which renders the mixture nonflowable under 50 pounds per square inch.

6. The improvement of claim 1 wherein the reaction mixture is a fluid.

References Cited

UNITED STATES PATENTS

| 3,354,251 | 11/1967 | Thoma et al. | 264—210 |
| 3,259,516 | 7/1966 | Dempsey et al. | 117—46 |
| 3,211,700 | 10/1965 | Weisfield | 260—75 |
| 3,061,530 | 10/1962 | Gonsalves | 204—159.19 |

MURRAY TILLMANN, Primary Examiner

R. B. TURER, Assistant Examiner

U.S. Cl. X.R.

260—28, 40 TN, 75 TN, 75 NB, 75 NA